3,525,251
Patented Aug. 25, 1970

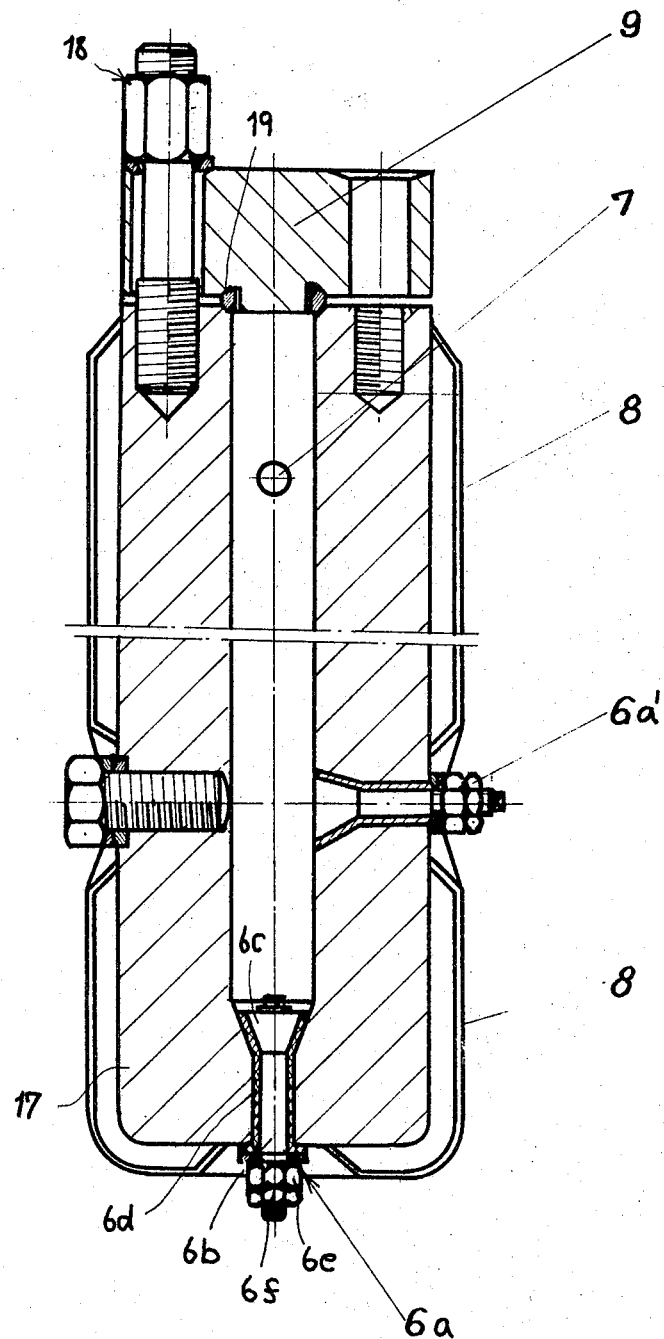

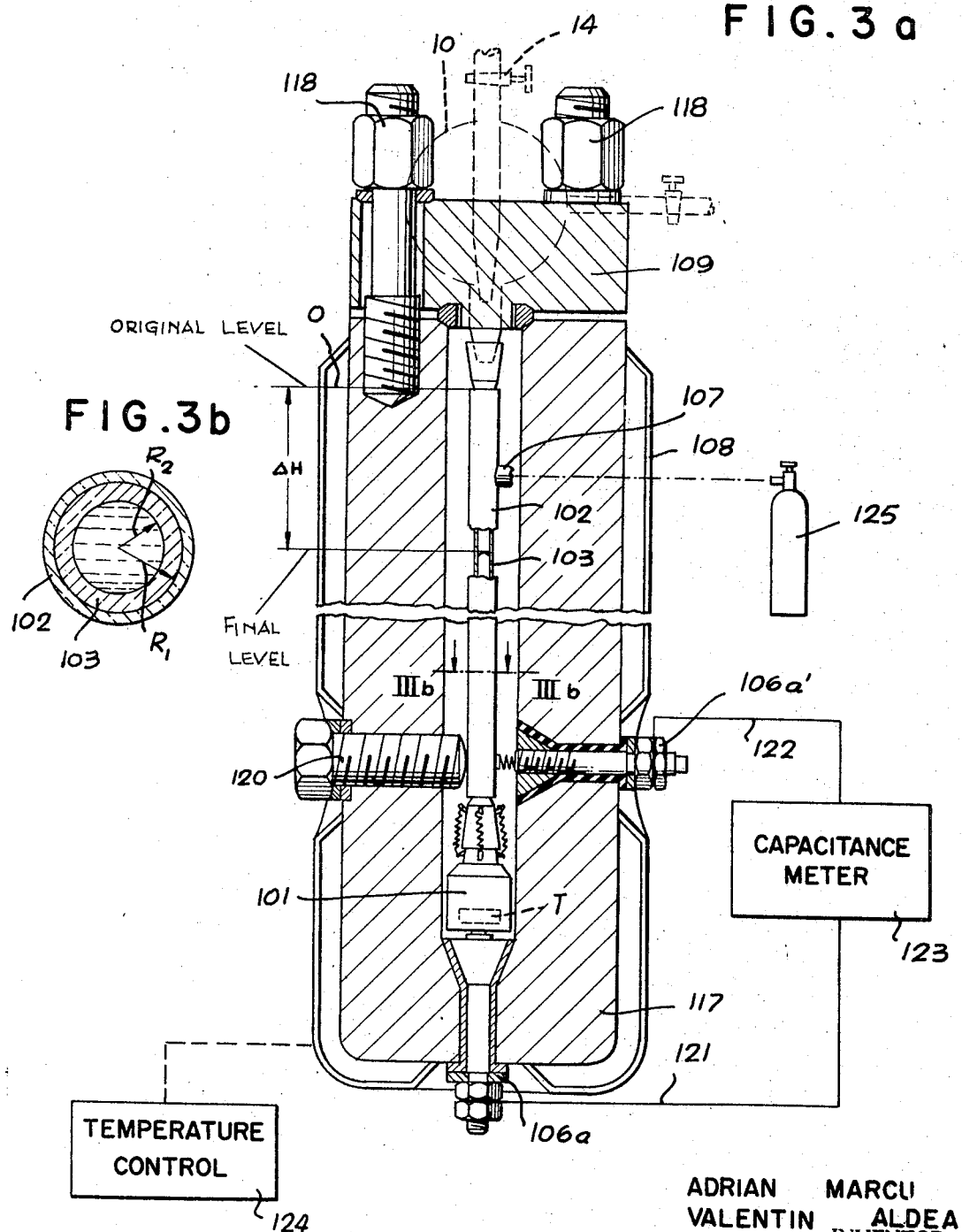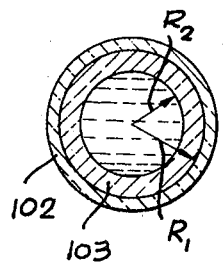

3,525,251
APPARATUS FOR MEASURING PORE DIMENSION AND DISTRIBUTION IN POROUS MATERIALS
Adrian Marcu, Str. Gheorgho Gheorghiu Dej 21, Medias, Rumania, and Valentin Aldea, Str. Dr. Petru Groza 19, Blaj, Rumania
Filed July 5, 1968, Ser. No. 742,694
Claims priority, application Rumania, July 6, 1967, 54,224
Int. Cl. G01n 15/08
U.S. Cl. 73—38        3 Claims

ABSTRACT OF THE DISCLOSURE

An apparatus for measuring pore dimensions and distribution in porous materials which includes a porosimeter adapted to receive the body to be analysed and having a tube of dielectric material (e.g. glass) coated externally with a conductive sheath. The porosimeter contains a conductive liquid (e.g. mercury) and has a reservoir connected with the tube by a ground tapered joint so that the tube can be separated from the reservoir. The porosimeter is received within a sleeve provided with contacts forming electrical connections with the conductive sheath and the conductive liquid within the tube and adapted to be pressurized so that the capacitance provides an indication of the change in level of the conductive liquid which penetrates the body to be analysed.

---

Our present invention relates to a method of and an apparatus for determining pore size and distribution in porous bodies using principles derived in part from mercury-penetration techniques.

Mercury-penetration techniques to determine pore size and the dimensional distribution of the pores of a porous material conventionally make use of a dilatometer, i.e. a vessel having a capillary or semicapillary column affixed to a bulb or reservoir, the column being calibrated so that the volume of mercury forced under pressure into the porous material can be ascertained. In such prior systems, the dilatometer is introduced into a pressure bomb, i.e. a vessel capable of withstanding elevated pressures.

In one method, the level of mercury in the column is determined by electrical contact between the mercury meniscus and a rod threadedly introduced into the pressure bomb. This arrangement has the disadvantage that relatively complex sealing mechanisms are required with frequent replacement of gaskets and seals to maintain the bomb pressure tight. Furthermore, it has been found necessary with these systems to fill the pressure-sustaining vessel with an electrically insulating liquid, generally methyl alcohol; this also increases the complexity of manipulation.

In a second technique, a spirally-wound wire resistor was suspended in the column so that the mercury therein shorted one or more turns of the resistor whereby the measured resistor value was a function of the change in the mercury level within the column. Difficulties were encountered with this system as well, predominantly because of surface interaction between the mercury and the resistance wire. Additionally, the wire was generally wound in a relatively fine spiral to ensure high sensitivity and the mercury often caused distortion of this spiral as the liquid level within the dilatometer tube changed.

It is, therefore, an important object of the present invention to provide an improved method of measuring the pore size and distribution in a porous material.

A further object of this invention is to provide a measuring device of the character described which allows the accurate measurement of the mercury level within a dilatometer without any of the disadvantages described earlier.

In accordance with our method a dilatometer, having a mercury column upstanding from a reservoir and adapted to be introduced into a pressure-sustaining vessel, is provided of nonconductive material at least along the capillary or semicapillary tube thereof and is coated externally with a metallic layer. The capacitance of the system measured between the mercury within the tube and the conductive layer along its exterior, is then proportional to the height in accordance with the relationship $$C \approx \frac{2 \ln (R_1/R_2)}{h}$$

wherein $h$ represents the height of the mercury column (i.e. the length of the mercury column juxtaposed with the conductive external sheath) and $R_1$ and $R_2$ represent the external diameter and internal diameter of the nonconductive tube coated externally with the metallic layer and contacted internally by the mercury; $C$, of course, represents the capacitance.

According to a more specific feature of this invention, the dilatometer or porosimeter has a reservoir of metal or other conductive material while the tube or mercury column thereof is formed of nonconductive material with a high dielectric constant. Best results have been obtained with glass. The external metal sheath may be vapor-deposited upon the glass tube or otherwise bonded to the latter while the measuring device can comprise any capacitance-measuring apparatus of conventional type; preferably a capacitance bridge, calibrated directly in mercury-level height, mercury-volume change or pore size can be employed. The pressure bomb of the present invention is provided with a thermostatically controlled jacket to maintain the temperature conditions during measurement substantially constant and may have a pair of contacts reaching into the interior of the bomb for engagement with the metallic container or reservoir and with the external sheath on the tube, respectively.

The above and other objects, features and advantages of the present invention will become more readily apparent from the following description and specific example, reference being made to the accompanying drawing in which:

FIG. 3 is an axial cross-sectional view through a pressure bomb adapted to receive the dilatometer of FIG. 1;

FIG. 3a is a view similar to FIG. 3, showing the dilatometer in place;

FIG. 3b is a cross-section drawn to enlarged scale taken along the line IIIb—IIIb of FIG. 3a.

Figure 1:
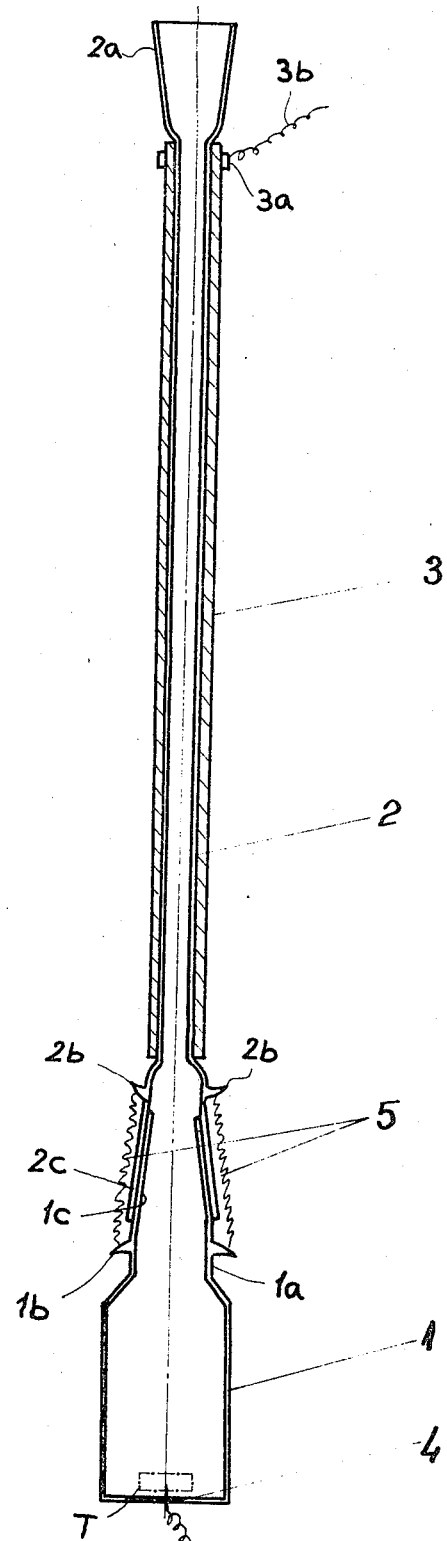
FIG. 1 is a vertical cross-sectional view through a capacitive dilatometer embodying the present invention.
Figure 2:
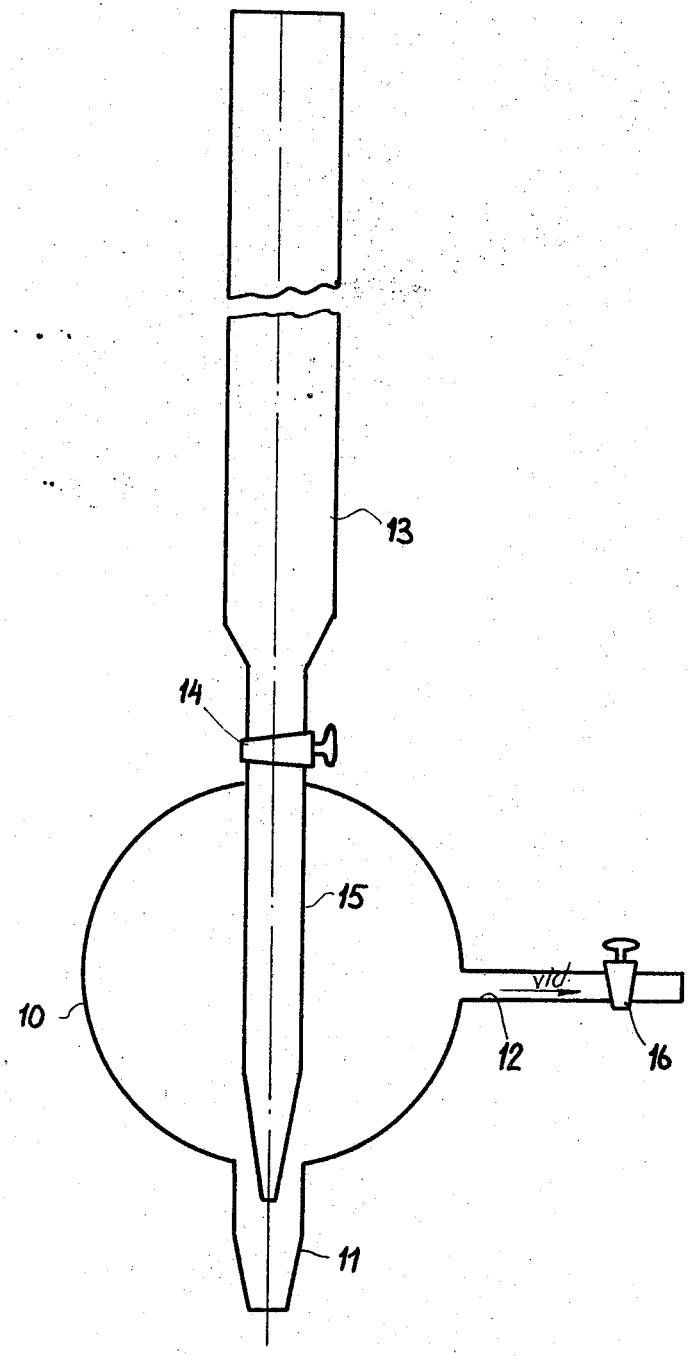
FIG. 2 is a diagrammatic vertical sectional view through a filling device for the dilatometer.

In FIG. 1, we show a capacitive diatometer in accordance with the present invention which comprises a metal container 1 forming a reservoir into which a tablet T of the porous material can be inserted, the reservoir having welded to a wall thereof, a platinum wire 4, adapted to connect the capacitance-measuring device with the mercury contained in reservoir 1. At its upper end, the reservoir 1 has a neck 1a provided with four angularly equispaced outwardly projecting lugs 1b below a ground tapered joint 1c, 2c formed between the reservoir 1 and a semicapillary tube 2. The ground tapered joint is held tightly by four tension springs 5 bridging the lugs 1b and corresponding lugs 2b at the lower end of the glass tube 2. The tube 2 is provided with a coating or sheath 3 of metal, e.g. a vapor-deposited silver or gold or the like, to which a collar 3a is affixed at the upper end of the tube 2 to connect a wire 3b to the sheath. Wire 3b may form the other connection to the capacitance bridge. An upwardly open socket 2a is formed at the upper end of tube 2 to receive the mouth of a filler device as shown in FIG. 2. The ratio of external radius ($R_1$) to internal radius ($R_2$) of the semicapillary tube 2 should be of the order of $$R_1/R_2 = 1.02 \text{ to } 5$$

In FIG. 2, we show the filling device which comprises an evacuation bulb 10 whose nozzle 11 fits into the socket 2a of tube 2 when it is desired to evacuate the system. Suction is applied at 12 by a conventional suction pump. A dispensing burette 13, filled with mercury and having a stopcock 14, is sealed into a bulb 10 and has its nozzle 15 extending downwardly into nozzle 11. Thus, after the tube 2 is evacuated, suction is terminated at 16, stopcock 14 is opened and the tube 2 thus filled with mercury.

In FIG. 3, we show the pressure bomb adapted to receive the dilatometer of FIG. 1, this bomb comprising a pressure-retaining steel cylinder 17 onto which a lid or cap 9 may be affixed via a bolt 18, a metal sealing ring 19 being clamped between the cover 9 and the cylinder 17. The latter is formed with a fitting 7 enabling the cylinder to be connected to a source of gas pressure (see FIG. 3a). A thermostatically controlled mantle 8 surrounds the cylinder 17 for maintaining the temperature thereof substantially constant while a contact 6a is provided in the base of the cylinder for engagement with the reservoir 1 to make electrical contact with the mercury in the latter. The contact 6a comprises a threaded stud 6b whose downwardly converging frustoconical base 6c is self-tightening against an insulating sleeve 6d when the nut 6e is tightened. A lead can be connected between the capacitance meter and the stud 6b via the terminal nut 6f. A similar contact is provided along the wall of the pressure-retaining cylinder 17 as shown at 6a' for engagement with the metal sheath of the dilatometer to constitute the other terminal of the capacitance meter. The operation of the system is described below in connection with FIGS. 3a and 3b and the specific example.

EXAMPLE

The dilatometer 100 shown in FIG. 3a has a stainless steel cylindrical surface 101 into which the porous tablet T of the material to be evaluated is placed. Thereafter, the dilatometer tube 102, carrying the vapor-depositing metal sheath 103, is fastened onto the reservoir 101 via a spring 105 as previously described. A screw 120, threaded into the wide wall of the pressure-retaining cylinder 117, holds the tube 102, 103 in place against the spring contact 106a' while the metallic reservoir 101 rests upon the contact 106a. Leads 121 and 122 connect these contacts with a capacitance meter 123 which, as has been indicated, may be calibrated directly in terms of volume of mercury by introducing into the dilatometer known quantities of mercury.

Figure 4A:
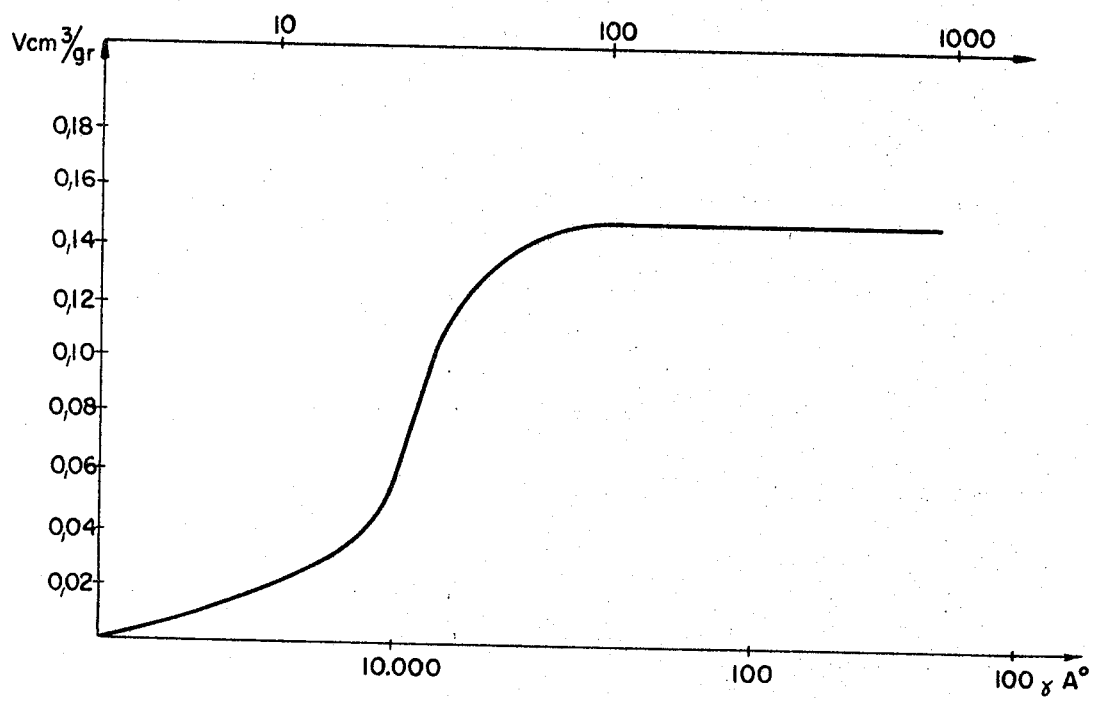
FIGS. 4a and 4b are graphs illustrating the method of the present invention.
Figure 4B:
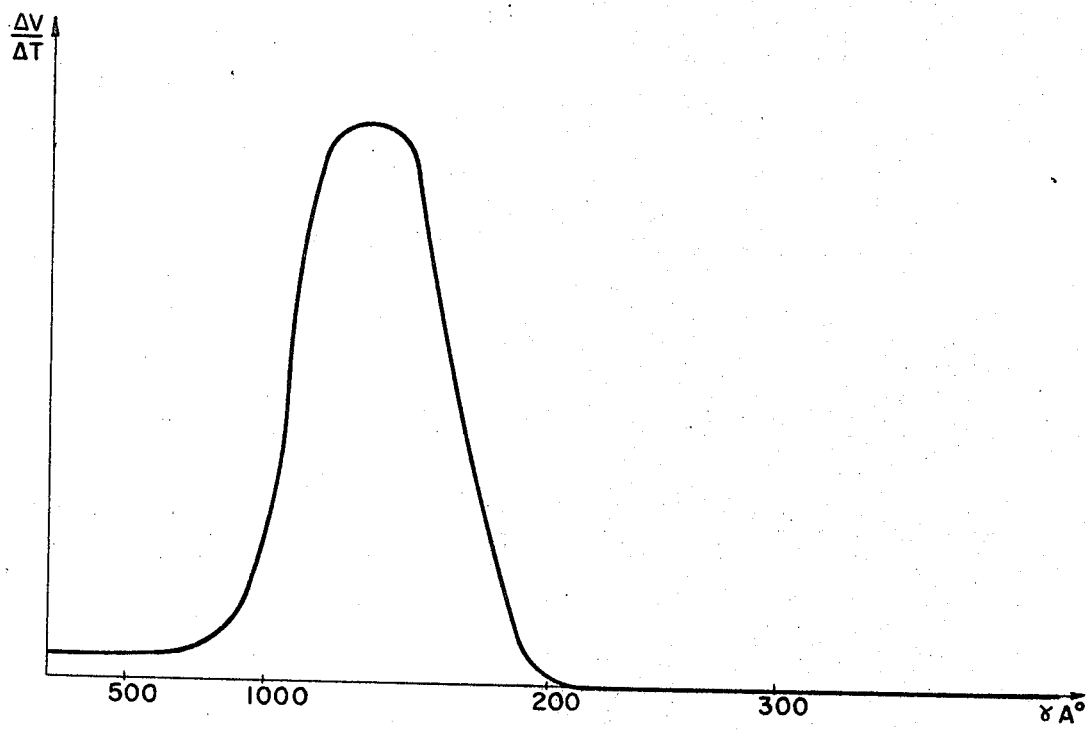

Before the cover 109 is placed upon the cylinder 107, the bulb 10 (dot-dash lines in FIG. 3a) is mounted upon the tube to evacuate the latter. Upon evacuation, the stopcock 14 is opened to allow mercury to fill the dilatometer. The latter is filled to the region O representing the original level. The tube 102 has a length of 2 to 100 cm., preferably 20 to 40 cm., while the radius ratio $R_1/R_2$ is of the order of 1.02 to 5, preferably 1.5 to 2, as has previously been noted. The tube 102 is composed of glass. Upon filling of the tube 102 with mercury, the bulb 10 is removed and the cover 109 placed upon the cylinder 117. Bolts 118 are tightened to clamp the cover 109 in place, thereby sealing the interior of the cylinder 117. The thermostatically controlled mantle 108 is brought to the desired temperature by the circulation of a heat exchange fluid therethrough via the temperature control represented at 124. Through the fitting 107, nitrogen is introduced into the vessel to drive the mercury into the porous body, a pressure cylinder 125 being connected to supply the nitrogen. The pressure within the vessel is gradually raised to 130 atmospheres, a measurement of the mercury level (and thus the volume of mercury driven into the porous body) is taken upon the capacitance meter 123 at every 50 atmospheres. The pore radius $\rho$ is given by the relationship $$\rho = \frac{2\sigma \cos \theta}{P}$$

where $\sigma$ is the surface tension of mercury, $\theta$ is the angle of mercury-solid contact and P is the pressure. In FIG. 4a, we have plotted the mercury volume along the ordinate while the pressure is given along the abscissa. The curve represents, therefore, the characteristic of the material evaluated. In FIG. 4b, the abscissa represents the pore radius $\rho$ so that the curve there shown indicates the differential distribution of pore size, the curve being obtained by taking the derivative of the curve of FIG. 4a with respect to the radius.

It has been found that, using the system of the present invention, it is possible with the capacitance meter in the precision class 1.5 to obtain a measurement whose error does not exceed 0.2% and that all errors hitherto encountered because of direct contact between the mercury and the level-measuring system are avoided. Moreover, the device is of simple construction and easily manipulated while allowing determinations under isothermic conditions.

We claim:
1. A system for measuring pore distribution and pore size in a porous body, comprising a porosimeter adapted to receive said body and a conductive liquid, said porosimeter being formed with a tube of dielectric material wherein said liquid has a fluctuation level in accordance with its penetration of said body, said tube being open at opposite extremities, a conductive sheath along the exterior of said tube, a reservoir at one extremity of said tube, said tube and said reservoir being formed with separable mating portions constituting a ground tapered joint for sealingly interconnecting said tube and said reservoir, means connectable with the other extremity of said tube for successively evacuating same and supplying said liquid to said tube, and means for measuring electrical capacitance across said liquid and said sheath for deriving a measurement of the volume of said liquid penetrating said body.

2. The system defined in claim 1, further comprising a pressure-retaining vessel receiving said porosimeter, means for introducing gas under pressure into said vessel to force said liquid into said body, said reservoir being provided with means making electrical contact with said liquid, said vessel being provided with a pair of contacts respectively engageable with said sheath and said reservoir and connectable with said means for measuring electrical capacitance, and thermostatically controlled means for maintaining said porosimeter at constant temperature during the measurement of electrical capacitance.

3. A porosimeter system for determining the porosity and nature of the pores of a solid body, comprising:
a porosimeter receptacle comprising:
an upright elongate tube of electrically insulating dielectric material having open an upper end formed with an upwardly widening frustoconical mouth,
a conductive sheath surrounding said tube and connectable to one terminal of a capacitance bridge,
a sample-containing vessel removably attached to said tube at the bottom end thereof,
a ground taper joint detachably connecting said tube with said vessel, said joint including a male taper member on said vessel and a female taper member sealingly receiving said male taper member and formed on said tube, and means forming an electrical connection with the interior of said vessel and connectable to another terminal of the capacitance bridge; and means for filling said receptacle with a conductive liquid and including an evacuable chamber connectable with a suction source and formed with a downwardly extending tapered male fitting matingly receivable in said mouth at the upper end of said tube for establishing communication between said tube and said chamber, and a duct extending through said chamber and reaching into said fitting for dispensing the conductive liquid into said tube.

References Cited

UNITED STATES PATENTS 3,371,519 3/1968 Slone et al. _____ 73—38

LOUIS R. PRINCE, Primary Examiner

W. A. HENRY II, Assistant Examiner